United States Patent [19]

Blankenship et al.

[11] Patent Number: 4,848,760
[45] Date of Patent: Jul. 18, 1989

[54] TIRE TUBE CLAMPING APPARATUS

[76] Inventors: Timothy R. Blankenship; Harold R. Blankenship, both of Rte. #2, Post Office Box 187, Elmore City, Okla. 73035

[21] Appl. No.: 151,628

[22] Filed: Feb. 2, 1988

[51] Int. Cl.⁴ ............................................. B23Q 3/18
[52] U.S. Cl. ............................. 269/62; 269/254 CS; 269/268
[58] Field of Search ...................... 269/62, 58, 254 CS, 269/268, 270, 238, 153, 154, 156; 81/15.2; 211/5, 23, 24, 89, 205; 248/201.1

[56] References Cited

U.S. PATENT DOCUMENTS

| | | | |
|---|---|---|---|
| 1,389,320 | 9/1921 | Rubinstein | 269/254 CS |
| 1,729,121 | 9/1929 | Parvin | |
| 1,867,248 | 7/1932 | Brotherman et al. | |
| 2,057,973 | 10/1936 | Plank | 152/27 |
| 2,193,514 | 3/1940 | Kendall | 18/18 |
| 2,384,803 | 9/1945 | Anderson | 81/15.2 |
| 2,509,328 | 5/1950 | Anderson | 81/15.2 |
| 2,712,769 | 7/1955 | Prescott | 269/254 CS |
| 3,088,348 | 5/1963 | Harris | 81/15.2 |

Primary Examiner—Frederick R. Schmidt
Assistant Examiner—David A. Holmes
Attorney, Agent, or Firm—Laney, Dougherty, Hessin & Beavers

[57] ABSTRACT

An apparatus for clamping tire tubes for repair thereof. The apparatus includes a base with a frame extending upwardly therefrom. A mandrel is attached to the upper end of the frame. A vertically movable actuating rod is positioned adjacent the frame and biased downwardly by a spring, the force of which may be adjusted. The lower end of the actuating rod is connected to a foot pedal for overcoming the force of the spring and raising the rod. The upper end of the rod has a yoke assembly connected thereto. The yoke assembly has a substantially U-shaped yoke forming a pair of upwardly extending arms, each arm having a substantially horizontal clamping bar connected thereto. The yoke is preferably at least partially flexible so that the arms will deflect outwardly as a result of the downward force exerted by the spring when the clamping bars engage a tire tube positioned on the mandrel.

18 Claims, 1 Drawing Sheet

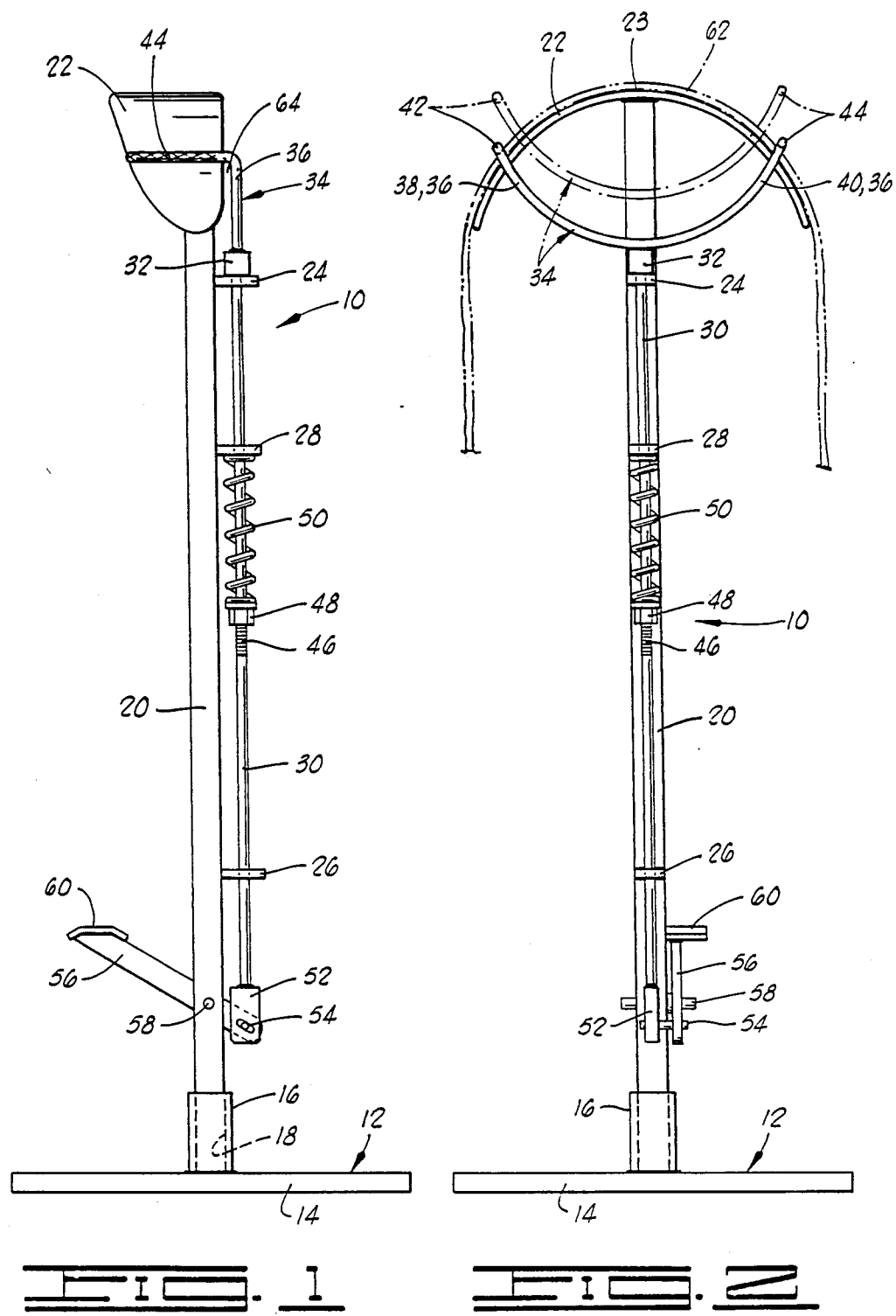

TIRE TUBE CLAMPING APPARATUS

BACKGROUND OF THE INVENTION

1. Field Of The Invention

This invention relates to apparatus for clamping tire tubes for facilitating repair thereof, and more particularly, to a tire tube clamping apparatus having yoke-mounted clamping bars for clampingly engaging a tire tube positioned on a mandrel.

2. Description Of The Prior Art

One previous device for holding inner tubes is disclosed in U.S. Pat. No. 2,384,803 to Anderson which includes a fixed mandrel and clamping arms which are normally raised above the mandrel. Pressing on a foot lever brings the arms down to engage and clamp a tire inner tube positioned on the mandrel. A latch may be used to hold the foot pedal in the clamping position. This device has the disadvantage of requiring the operator to physically hold the foot pedal down or to engage a latch. In the present invention, clamping bars are normally biased toward the mandrel and are raised therefrom only by actuating a foot pedal.

In another device of Anderson, disclosed in U.S. Pat. No. 2,509,328, fingers on a pair of arms are again used to clamp a tire tube to a mandrel. In operation, the operator presses the mandrel downwardly to overcome the tension provided by springs and must move the mandrel laterally away from, or toward, the fingers. Once aligned with the fingers, the downward pressure on the mandrel is relieved and the spring biases the mandrel upwardly toward the fingers, clamping the tube. This device has the disadvantage of requiring all movement to be carried out by the hands of the operator, and thus positioning of the tube on the mandrel during the clamping operation is difficult. The present invention and the earlier Anderson patent utilize foot actuation.

Previous devices which show pivoted clamping members include Harris U.S. Pat. No. 3,088,348; Brotherman U.S. Pat. No. 1,867,248 et al.; and Parvin U.S. Pat. No. 1,729,121.

The present invention also utilizes clamping bars mounted on a substantially U-shaped yoke which allows flexibility when clamping a tire tube on the mandrel. The present invention further has a mandrel spaced from the yoke and mounted on a vertical member which does not interfere in any way with the positioning of the tire tube on the mandrel, unlike devices in the prior art.

SUMMARY OF THE INVENTION

The tire tube clamping apparatus of the present invention comprises mandrel means for receiving a portion of a tire tube thereon, clamping means for clamping the tire tube against a working surface of the mandrel means, and biasing means for biasing the clamping means toward a clamping position. The apparatus may further comprise means for overcoming the biasing means and moving the clamping means to an unclamped position spaced from the mandrel means.

In a preferred embodiment, the clamping means is characterized by a yoke assembly comprising a yoke with a pair of upwardly extending arms, and a clamping bar extending from an upper end of each of the arms such that the arms are positioned adjacent the working surface of the mandrel means. Preferably, the yoke is spaced from the mandrel means to allow clearance for a tire tube portion therebetween. The arms of the yoke are preferably at least partially flexible such that a force exerted by the biasing means is sufficient to outwardly deflect the arms of the yoke when the clamping means is in the clamping position.

One embodiment of the tire tube clamping apparatus comprises a frame member, a tire tube mandrel attached to the frame member, a yoke adjacent the mandrel and movable with respect thereto, the yoke having a pair of arms, and a clamping bar extending from each of the arms of the yoke and positioned adjacent the mandrel for clampigly engaging a tire tube thereon.

The yoke is connected to an actuating rod movable with respect to the frame member, and the actuating rod is preferably pivotally connected to, and movable by, a foot pedal pivotally connected to the frame member. Biasing means may be provided for biasing the actuating rod downwardly. The biasing means is preferably characterized by a coiled spring disposed around a portion of the actuating rod, and means are provided for adjusting a force exerted by the biasing means.

An important object of the present invention is to provide a tire tube clamping apparatus for clamping a tire tube in a fixed position so that it may be easily repaired.

Another object of the invention is to provide a tire tube clamping apparatus having clamping means which is biased by biasing means toward a clamping position.

A further object of the invention is to provide a tire tube clamping apparatus having yoke-mounted clamping bars for clampingly engaging a tire tube positioned on the working surface of a mandrel.

Additional objects and advantages of the invention will become apparent as the following detailed description of the preferred embodiment is read in conjunction with the drawings which illustrate such preferred embodiment.

BRIEF DESCRIPTION OF THE DRAWINGS

FIG. 1 is a side elevation view of the tire tube clamping apparatus of the present invention.

FIG. 2 illustrates a rear view of the apparatus.

DESCRIPTION OF THE PREFERRED EMBODIMENT

Referring now to the drawings, and more particularly to FIG. 1, the tire tube clamping apparatus of the present invention is shown and generally designated by the numeral 10. At its lower end, apparatus 10 includes a base 12 with a substantially horizontal plate portion 14 with a frame support 16 extending upwardly therefrom. Frame support 16 has an upwardly opening cavity 18 therein which is adapted for receiving a substantially vertical frame member 20. Frame member 20 may be affixed to frame support 16 by means of fasteners, welding or the like. Preferably, however, frame member 20 is separable from base 12 to facilitate portability.

Frame member 20 is preferably made of hollow tubing of substantially square cross section, but the actual geometry is not critical. Attached to the upper end of frame member 20 by welding or the like is a mandrel means for receiving a portion of a tire tube thereon. In one embodiment, the mandrel means may be characterized by a tire tube mandrel 22. As best seen in FIG. 2, mandrel 22 is of substantially curvilinear configuration. An upwardly facing surface 23 of mandrel 22 may be said to be a working surface 23 of the mandrel. Preferably, mandrel 22 has no square corners in order to minimize the possibility of damage to the tire tube when positioned on the mandrel. As viewed in FIG. 2, mandrel 22 is substantially symmetric, and a central portion thereof is attached to frame member 20. Mandrel 22 curves downwardly.

As viewed in FIG. 1, the front of the apparatus is to the left, and the rear of the apparatus is to the right. Attached to frame member 20 and extending rearwardly therefrom are a pair of rod guides 24 and 26, each defining a hole therethrough. Also extending rearwardly from frame member 20, and preferably positioned between rod guides 24 and 26 is a spring guide 28. Spring guide 28 also defines a hole therethrough, substantially similar to the holes in rod guides 24 and 26. A actuating rod 30 is positioned adjacent each of rod guides 24 and 26 and spring guide 28. Preferably, acutating rod 30 is slidably disposed through the holes in rod guides 24 and 26 and spring guide 28. Attached to the upper end of actuating rod 30 is a coupling portion 32 of a yoke assembly 34. Coupling 32 and the upper end of actuation rod 30 may be connected by threading engagement, welding, or other means known in the art.

Attached to coupling 32 is the lowermost concave portion of an upwardly opening yoke 36 of substantially U-shaped configuration. Thus, yoke 36 forms a pair of upwardly extending arms 38 and 40 on opposite sides of frame member 20, as viewed in FIG. 2. Yoke 36 is preferably at least partially flexible.

Attached to arms 38 and 40, respectively, are a pair of substantially horizontal clamping bars 42 and 44. Bars 42 and 44 extend forwardly from yoke 36 and are thus positioned adjacent working surface 23 of mandrel 22. Bars 42 and 44 will be seen to form at least a portion of a clamping means for clamping a tire tube against working surface 23 of the mandrel means. As shown in FIG. 1, the outer surface of bar 44, and also of bar 42, may be knurled to increase the gripping engagement with a tire tube positioned on mandrel 22, as hereinafter described in more detail.

An intermediate portion 46 of actuating rod 30 is threaded and has an adjusting nut 48 threadingly engaged therewith. Alternatively, nut 48 can slide on rod 30 and be held in position by a set screw or other fastening means. Disposed between nut 48 and spring guide 28 is a biasing means 50 for biasing the clamping means toward a clamping position. In the illustrated embodiment, biasing means 50 is characterized by as coiled spring 50 disposed around actuating rod 30. It will be seen by those skilled in the art that, when spring 50 is in compression, actuating rod 30 and yoke assembly 34 attached thereto are downwardly biased by the spring. The downward biasing force may be adjsted by movement of adjusting nut 48. Thus, means are provided for adjusting a force exerted by the biasing means. It will also be seen by those skilled in the art that the downward motion of actuating rod 30 and yoke assembly 34 is limited by the contact of clamping arms 42 and 40 with mandrel 22.

At the lower end of actuating rod 30 is a pivot guide 52. Pivotally connected to pivot guide 52 by a pivot pin 54 is a foot pedal 56. An intermediate portion of foot pedal 56 is pivotally connected to a lower portion of frame member 20 by another pivot pin 58. The forward end of foot pedal 56 has an upwardly facing foot rest 60 disposed thereon.

OPERATION OF THE INVENTION

In the normally clamped position of FIG. 1, clamping arms 44 and 42 are engaged with the working surface 23 of mandrel 22. As already discussed, this means that actuating rod 30 and yoke assembly 34 are in their downwardmost positions due to the biasing force exerted by biasing means 50. This also corresponds to an upwardmost position of the forward end of foot pedal 56 and foot rest 60.

In operation, the operator presses downwardly on foot rest 60 which forces actuating rod 30 and yoke assembly 34 upwardly, thus providing one embodiment of a means for overcoming the biasing means and moving the clamping means to an unclamped position spaced from the mandrel means. When this upward movement of actuating rod 30 and yoke 34 occurs, adjusting nut 48 is moved closer to spring guide 28, compressing biasing means 50. Thus, it is necessary for the operator to maintain downward pressure on foot pedal 56 in order to hold yoke assembly 34 in its upwardmost position shown in phantom lines in FIG. 2. In this raised position, clamping arms 42 and 44 are spaced above mandrel 22 so that a tire tube 62 of a kind known in the art may be positioned on the working surface 23 of mandrel 22. As illustrated in FIG. 2, tube 62 may hang downwardly from mandrel 22.

In the preferred embodiment, yoke assembly 36 is spaced rearwardly from mandrel 22 such that a gap 64 is defined therebetween. This gap allows tire tube 62 to hang over the rear of mandrel 62 and remain free of yoke 36.

Once the tire tube has been positioned as desired on mandrel 22, the operator relieves the pressure on foot pedal 56 which allows clamping arms 42 and 44 to move downwardly against tube 62, thus clamping it in place on the mandrel. As already indicated, bars 42 and 44 may be knurled to increase gripping engagement with the tire tube. Because of the mounting of bars 42 and 44 on yoke 36, bars 42 and 44 may be deflected outwardly slightly with respect to mandrel 22 because of the flexibility of the yoke configuration. This flexible gripping, in combination with the force exerted by biasing means 50, causes tube 62 to be pulled tightly across the portion working surface 23 of mandrel 22 which is between bars 42 and 44. In this tight, smooth orientation of tube 62, the damaged area of the tube may be easily repaired.

Once the tube is repaired, foot pedal 56 is again depressed, raising bars 42 and 44, and the tube is easily removed from mandrel 22.

It will be seen, therefore, that the tire tube clamping apparatus of the present invention is well adapted to carry out the ends and advantages mentioned as well as those inherent therein. While a presently preferred embodiment of the apparatus has been shown for the purpose of this disclosure, numerous changes in the arrangement and construction of parts may be made by those skilled in the art. All such changes are encompassed within the scope and spirit of the appended claims.

What is claimed is:

1. A tire tube clamping apparatus comprising:
    mandrel means for receiving a portion of a tire tube thereon;
    clamping means for clamping said tire tube against a working surface of said mandrel means, said clamping means being characterized by a yoke assembly comprising:

an upwardly opening yoke with a pair of upwardly extending and outwardly flexible arms; and a clamping bar extending substantially horizontally from an upper end of each of said arms such that said arms are positioned above and adjacent said working surface of said mandrel means; and biasing means for biasing said clamping means toward a clamping position, wherein said clamping bars engage a tire tube received on said mandrel means, thereby tightly pulling said tire tube across said mandrel means by flexible action of said arms.

2. The apparatus of claim 1 further comprising means for overcoming said biasing means and moving said clamping means to an unclamped position spaced from said mandrel means.

3. The apparatus of claim 1 wherein said biasing means is characterized by a compression spring.

4. The apparatus of claim 1 wherein said yoke is spaced rearwardly from said mandrel means.

5. The apparatus of claim 1 wherein a force exerted by said biasing means is sufficient to outwardly deflect said arms of said yoke when said clamping means is in said clamping position.

6. A tire tube clamping apparatus comprising:
a frame member;
a tire tube mandrel attached to said frame member;
a upwardly opening, substantially U-shaped yoke disposed adjacent said mandrel and movable with respect thereto, said yoke having a pair of integral arms; and
a clamping bar extending substantially perpendicularly from each of said arms and positioned adjacent said mandrel for clampingly engaging a tire tube thereon.

7. The apparatus of claim 6 wherein said yoke is connected to an actuating rod movable with respect to said frame member.

8. The apparatus of claim 7 wherein said actuating rod is pivotally connected to, and movable by, a foot pedal pivotally connected to said frame member.

9. The apparatus of claim 7 further comprising biasing means for biasing said actuating rod downwardly.

10. The apparatus of claim 9 wherein said biasing means is characterized by a coiled spring disposed around a portion of said actuating rod.

11. The apparatus of claim 10 further comprising means for adjusting a force exerted by said biasing means.

12. The apparatus of claim 6 wherein said arms extend upwardly.

13. The apparatus of claim 6 wherein said yoke is at least partially flexible such that said arms flex outwardly from one another when said clamping bars are clampingly engaged with said tire tube on said mandrel, whereby said tire tube is pulled tightly across said mandrel between said clamping bars.

14. A tire tube clamping apparatus comprising:
a base;
a substantially vertical frame extending upwardly from said base and rigidly connected thereto;
a curvilinear mandrel rigidly attached to an upper end of said frame;
at least one rod guide rigidly attached to a side of said frame;
an actuating rod extending substantially parallel to said frame member and slidably received in said rod guide, said rod having an upper end and a lower end;
a foot pedal pivotally connected to said lower end of said rod and further pivotally connected to said frame such that downward actuation of said foot pedal will force said rod upwardly; and
a yoke assembly attached to said upper end of said rod and movable therewith, said yoke assembly comprising:
a substantially U-shaped yoke having a pair of outwardly flexible arms extending upwardly from said actuating rod and substantially co-planar therewith; and
a pair of clamping bars extending perpendicularly from upper ends of said arms and disposed on an uppper side of said mandrel, said bars having a clamping position adjacent said mandrel for clamping a tire tube thereon wherein said tire tube is pulled tightly across said mandrel between said bars by flexible action of said arms and an unclamped position spaced upwardly from said mandrel.

15. The apparatus of claim 14 wherein said actuating rod has a threaded portion thereon and further comprising:
a spring guide attached to said frame member and disposed adjacent said actuating rod;
an adjusting nut threadingly engaged with said threaded portion of said actuating rod; and
biasing means disposed between said spring guide and said adjusting nut for biasing said actuating rod and yoke assembly downwardly with respect to said mandrel and frame member.

16. The apparatus of claim 15 wherein said biasing means is characterized by a compression spring disposed around said rod.

17. The apparatus of claim 14 wherein said bars have a knurled outer surface.

18. The apparatus of claim 14 wherein said yoke, including said arms thereof, are spaced rearwardly from said mandrel.

* * * * *